June 18, 1935.    F. J. GIVEN    2,005,582
INDUCTIVE DEVICE
Filed March 6, 1934

INVENTOR
F. J. GIVEN
BY
ATTORNEY

Patented June 18, 1935

2,005,582

UNITED STATES PATENT OFFICE 2,005,582

INDUCTIVE DEVICE

Frederick J. Given, East Orange, N. J., assignor to Bell Telephone Laboratories, Incorporated, New York, N. Y., a corporation of New York Application March 6, 1934, Serial No. 714,341

8 Claims. (Cl. 178—46)

This invention relates to inductive devices and more especially to cases for enclosing and protecting loading coils.

It is an object of this invention to provide a loading coil case which will be compact and inexpensive and at the same time give adequate protection to the enclosed coils.

To this end the loading coil case in one specific form consists of a cylindrical shaped metallic container in which the coils are mounted on and supported by the cable stub which enters the case through the top plate.

Figure 1:
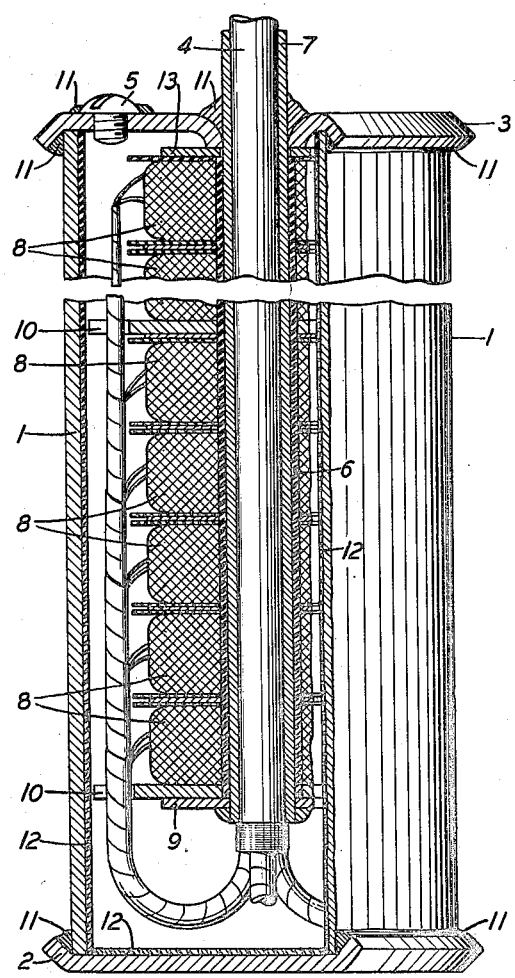
Figure 3:
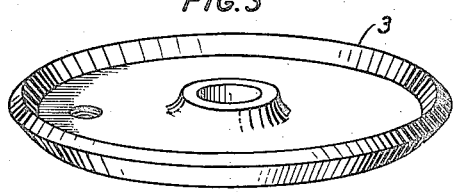
Figure 2:
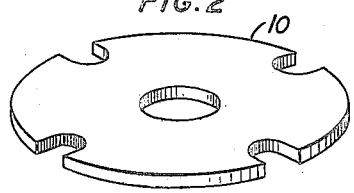

The invention will be better understood from the following description and attached drawing, Fig. 1 of which is a front view in partial section of the loading coil case showing the coils in position; and Figs. 2 and 3 show certain of the parts in detail.

Referring now to Fig. 1, there is shown a cylindrical metallic cover 1 to which is fastened a circular bottom plate 2 having its outer edge turned up as shown to form a pocket for solder or other material by which the two parts are fastened together.

The top plate sheet 3 shown in Fig. 3 is similar to the bottom plate 2 but is provided with a hole through which the lead covered cable 4 enters the case. The hole through which the cable passes has its sides bent down as shown so that solder or other welding material may fasten the cable to the top plate which, in turn, is soldered or welded to the metallic cylinder 1.

A second hole offset from the center is provided in the top plate by means of which the drying and impregnating of the internal parts can be carried out. This hole is closed by a round head screw 5 which is also soldered to the case as shown in Fig. 1.

A layer of hemp wood pulp insulation 6 surrounds the lead sheath 7. The coils 8 are mounted on the cable stub and are supported thereon by means of metallic washers 9 and 13 which are soldered or fastened in a satisfactory manner to the lead sheath. Washers of insulating material 10 shown in Fig. 2 are placed between metallic washers 9 and 13 and the adjacent coils. In certain cases it may be desirable to spin the lower end of the cable sheath over the washer 9 instead of soldering, brazing or welding.

The cable is fanned out in two or more strands as required, depending upon the number of coils in the case. The insulating washers 10 are provided with notches as indicated which act as guides for the leads to the individual coils. These washers are also of such diameter as to keep the assembly of coils centrally located relative to the sides of the case. If a considerable number of coils are to be enclosed in the case it is preferable that an insulating washer 10 be inserted at sufficient intervals to provide rigidity. Usually the number of coils to be enclosed is five or multiples thereof, but obviously the case can accommodate any number up to the point where the size of the stub exceeds the inside diameter of the coils.

Washers of metal faced on either side with washers of insulating material are used for the purpose of minimizing cross-talk between coils. Solder or other welding material is used to hold the individual parts of the case together as indicated at 11, 11, etc., to insure that the case is airtight and moisture-proof. A layer of hemp wood pulp insulation 12 is used to line the side and bottom of the case.

It is to be understood that various modifications may be made in the case as described and still be within the spirit and scope of the invention as recited in the appended claims.

What is claimed is:

1. A loading coil case, coils enclosed in said case, a stub cable leading into said case from one end only, leads to said coils, said cable passing through and having means to support said coils independently of said case.

2. An inductive device comprising a plurality of coils, a container for said coils, a stub cable having the leads to said coils extending from its extremity, said cable having means thereon to support said coils in said container.

3. In combination, a plurality of coils, leads to said coils, said leads being grouped together to form a cable, a lead sheath for said cable, said coils being mounted on said lead sheathed cable and supported on means mounted at one end thereof, said coils, cable and leads being enclosed in a unitary structure also mounted on the lead cable sheathing and at another point.

4. In combination, a plurality of toroidal coils, a cable containing leads to said coils, said cable passing through said coils and having means to support them from one extremity, a container for said coils, and means to fasten said cable to the top of said container in a manner to support its contents from the top of said container.

5. In combination, a plurality of toroidal coils, a cable containing leads to said coils, said cable passing through said coils, a lead sheath surrounding said cable, a washer attached to said lead sheath as the lower support for said coils and a container for said coils.

6. A combination according to claim 5 in which said washer is attached to said lead sheath by welding, brazing, soldering or other similar means.

7. A combination according to claim 5 in which said washer is attached to said lead sheath by spinning said lead sheath over said washer.

8. In combination, a plurality of loading coils, a stub cable containing the leads to said coils, said cable passing centrally through each of said coils and having means to support the coils from one extremity of the cable.

FREDERICK J. GIVEN.